United States Patent [19]
Murray

[11] 3,964,898
[45] June 22, 1976

[54] PROCESS FOR BATCH PRODUCTION OF SPONGE IRON

[75] Inventor: Hans Edward Henrik Murray, Djursholm, Sweden

[73] Assignee: SKF Nova AB, Gothenburgh, Sweden

[22] Filed: May 5, 1975

[21] Appl. No.: 574,576

[30] Foreign Application Priority Data
May 9, 1974 Sweden .............................. 7406175

[52] U.S. Cl. ........................................ 75/11; 75/35
[51] Int. Cl.² .......................................... C22D 7/04
[58] Field of Search .......................... 75/11, 33–38, 75/91, 49

[56] References Cited
UNITED STATES PATENTS

| | | | |
|---|---|---|---|
| 3,032,410 | 5/1962 | O'Day .............................. | 75/35 X |
| 3,098,738 | 7/1963 | Madaras ............................ | 75/34 |
| 3,148,050 | 9/1964 | Von Bogdandy ................. | 75/91 X |

Primary Examiner—M. J. Andrews
Attorney, Agent, or Firm—Daniel M. Rosen

[57] ABSTRACT

Sponge iron is produced by a process including a charging step during which an iron oxide is arranged as a stationary bed in a furnace chamber, a heating step during which a hot, preferably non-reducing atmosphere is cased to flow through the stationary bed, and a reduction step during which a hot reducing atmosphere is caused to flow through the stationary bed to reduce the iron oxide to sponge iron. Optionally, there is a final cooling step during which cold non-oxidizing atmosphere cools the sponge iron. The relatively hot atmosphere which has just passed through the stationary bed is counter-currently heat exchanged with the relatively cool fresh atmosphere about to enter the furnace chamber.

34 Claims, 1 Drawing Figure

PROCESS FOR BATCH PRODUCTION OF SPONGE IRON

The present invention relates to the gas reduction of metal oxides to elementary metal at high temperature. The invention is particularly suitable for use in direct gas reduction of shaped bodies of iron oxide in powder form to sponge iron and will be described in connection with such application. It is, however, also apparent from the description, that the invention is applicable also to the reduction of metal oxides other than iron oxide. The invention, more precisely, relates thus to an improved process for batch production of sponge metal and to a furnace plant for carrying out the process.

The improved process is of the kind which includes a charging step, during which an oxide material of the metal is arranged as a stationary bed in a furnace chamber, at least one heating step, during which a hot, preferably non-reducing atmosphere is caused to flow through the stationary bed for heating the same, at least one reduction step, during which hot reducing atmosphere is caused to flow through the stationary bed of oxidic material for reducing the same to sponge metal, and, when necessary, a cooling step, during which cold non-oxidizing atmosphere is caused to flow through the stationary bed for cooling the sponge metal formed.

The furnace plant, furthermore, is of the kind comprising at least one furnace with a heatable furnace chamber and means for supporting in the furnace chamber a stationary bed of an oxidic charge of the metal, and auxiliary equipment for causing, during a heating period, a reduction period, and, when necessary, a cooling period, hot, preferably non-reducing atmosphere, hot reducing atmosphere, and, cold non-oxidizing atmosphere, respectively, to flow through the stationary bed.

In this context, the term "oxide material" is not to be understood to refer only to ore, which has been crushed to a suitable grain size and possibly pelletized, but also to other metal oxide material in powder form such as calcined pyrites, crushed scale, red fume (i.e., fume particles from oxygen blowing of iron or steel baths), cleaned grinding sludge and rill filings, etc., which waste products are agglomerated to form shaped bodies of suitable size by pelletizing or the like.

As the conventional blast furnace process in no way constitutes an ideal process for the reduction of iron ore to metallic iron, intensive effects have been made during the last hundred years in trying to develop a process of direct reduction which at least in certain cases might be more advantageous. The term "direct reduction process" is to be understood as a reduction process, for which no blast furnace is used, i.e., reduction by gas, but without melting the iron produced. When producing sponge iron, as a matter of fact, the iron ore always is reduced with gas. Even when the ore is mixed with solid carbon the reduction takes place by means of the surrounding carbon monoxide.

Reviews on and comparisons between different sponge iron processes are covered, for example, in Jernkontorets Annaler (Records of the Swedish Ironmasters' Association), 142 (1958):6, pages 289-355 (Wiberg M., Några nya sätt att göra järnsvamp (Some New Ways of Making Sponge Iron), further in Jernkontorets Annaler 154(1970), pages 329-340 (Notini, U., Direktreduktionsprocessernas aktuella läge (The Actual Situation of the Direct Reduction Processes)) and in Jernkontorets Annaler 157 (1973), pages 15-22 (Eketorp, S., Järnsvampmetodernas nuläge (The Present Situation of the Sponge Iron Methods)). The last mentioned article, particularly, provides an excellent report on the main problems, disadvantages and inconveniences involving the different types of sponge iron processes. As a general conclusion concerning the choice of sponge iron process, the author of the article states that "the Midrex- and HyL-processes seem to be the only ones which may be contemplated."

The Midrex or Midland-Ross process is a shaft-furnace process for the continuous production of sponge iron and as such, entirely different from the present invention.

The HyL process which is described in, for example, the U.S. Pat. Nos. 2,900,247, 3,128,174, 3,423,201, 3,467,368 and 3,684,486 operates with stationary beds and has been developed by Hoyalata y Lamina, Monterrey, Mexico. The plant comprises, in addition to the equipment for reforming the natural gas, four retorts for preheating the ore, for reduction, for cooling the sponge and for emptying and charging. Desulphurized natural gas, which 1973 in Mexico fetched a price of 1.70 SwCr/GJ (7.20 SwCr/Gcal) is reformed with water vapour to a reduction gas holding 70-73% $H_2$, approximately 15% CO, 6-7% $CH_4$ and the remainder being $CO_2 + N_2$. Subsequent to its cooling in a scrubber for separation of the excess water vapour and $CO_2$, the gas is passed to the first reactor containing completely reduced sponge, which is cooled thereby. The gas thereafter is passed to the second reactor where final reduction takes place, and continues to the third reactor for preheating and pre-reduction. Between each step the gas is cooled in a scrubber for separation of water vapour and is thereafter heated in a recuperator. By partial combustion, the temperature of the gas is increased additionally, before the gas enters the second and third reactor, respectively. In the fourth reactor sponge is discharged and ore is charged. The total operation cycle covers 12 hours, which means that each reactor remains for 3 hours in each process step. The gas leaving the third reactor still contains substantial amounts of CO and $H_2$ and is utilized for heating the reforming furnace and recuperators. A certain amount of natural gas, however, must be added to cover the heat demand. It may be pointed out in this context, that in the opinion of experts a future gas/oil price of at least 6 SwCr/GJ can be expected (see Teknisk Tidskrift, (104) 1974: 1-2, pages 32-35). The reduction temperature amounts to 850°-1000°C. The reduction degree is relatively low, approximately 86-87%. A reduction driven to a higher degree would imply a lower production and a substantially higher fuel consumption. The consumption even now is relatively high, due to the repeated cooling and heating of the reduction gas.

The object of the present invention is to decrease the total energy consumption during the direct reduction to sponge metal of a stationary bed of metal oxide material arranged in a furnace chamber.

This object is achieved according to the present invention in the process referred to in the second paragraph of this description, by heat exchanging during the heating step and reduction step the relatively hot used atmosphere, which just has passed through the stationary bed, at least substantially in counter-current with relatively cold, fresh atmosphere in order to at least preheat the same befoe introducing it into the furnace chamber directly after the heat exchange, and by conducting during the possible cooling step ingoing cold fresh atmosphere and outgoing relatively hot used atmosphere in a non-heat-exchanging relationship to each other.

According to the invention, furthermore, said object is achieved in the furnace plant referred to in the third paragraph of this description, in that said auxiliary equipment comprises a gas-to-gas heat exchanger of generally counter-current type which is at least partially built-in into the furnace and is located with a hot end in the furnace chamber or in immediate connection thereto. The said hot end includes an outlet located upstream of the stationary bed for atmosphere heated in the heat exchanger and an inlet located downstream of said bed for gas to be cooled in the heat exchanger. As a result, during the heating period and reduction period the relatively hot used atmosphere, which just has passed through the stationary bed can be cooled by heat exchange substantially in counter-current with relatively cold, fresh atmosphere, which thereby is at least preheated before being introduced into the furnace chamber directly after the heat exchange. The said auxiliary equipment, if the sponge metal is to be cooled in the furnace, further comprises re-directing means conducting, during the cooling period, the cold cooling atmosphere entering the stationary bed and the heated cooling atmosphere outgoing from the bed in a non-heat-exchanging relationship to each other.

As is apparent from the aforesaid, one can in certain cases dispense with the cooling of the sponge metal in the furnace. For example, a steel furnace may be provided adjacent to a sponge iron furnace, and the freshly-reduced uncooled sponge iron with a temperature of, for example, approximately 500°C may be charged directly into the steel furnace. The sponge iron produced should suitably have a relatively high carbon content in order to compensate for the oxygen taken up by the hot sponge iron from the air during the transport of the sponge iron between the furnaces.

The plant preferably is designed so as to permit at least the main part of the gas, which has passed through the bed, to be recirculated to the bed, where appropriate after purification of the gas with respect to reaction products formed during the passage through the bed and after compensation for gas consumed during the reaction. Thereby, the consumption of gas is reduced substantially.

Furthermore, it is highly advisable to design the plant so as to permit evacuation of the closed circuit, in which the gas is circulated, and recovery of the gas. This renders it possible, provided the furnace is heated electrically, to carry out heating and reduction as well as cooling without appreciable consumption of gas other than that which is consumed during the reduction reaction proper, i.e., without substantially any gas loss. Thus, one can expect that the real consumption of reducing gas for the reduction reaction almost entirely agrees with the theoretical consumption, viz. about 27 kmol (i.e., about 600 m$^3$ at 0°C and 101.3 kPa) per metrical ton of reduced iron.

The plant according to the invention, may further, in a particularly simple manner, be designed so as to permit the pressure, temperature, speed and composition of the atmosphere at any moment to be adjusted entirely at will for bringing about optimum conditions. At a predetermined gas speed (m/s), for example, the flow rate (kg/h) through the charge can be increased by compressing the atmosphere so that its density is increased, whereby during a definite time interval a greater number of active gas molecules can be passed through the charge.

It is with such a plant possible, for example, to adjust the carbon content of the sponge iron according to desire and to the field of application of the sponge iron. Thus, in one single furnace sponge iron with a high carbon content for remelting in a steel furnace as well as sponge iron with a low carbon content for the production of powders suitable for powder metallurgical processes can be produced. In is even possible to produce an entirely carbon-free sponge iron for special applications, e.g. as basic material for remelting to ferritic and austenitic stainless steels and for soft magnetic steel (i.e., steels having a high magnetic permeability but a low coercive force) and for (dynamo and transformer) sheets for the electric industry.

The invention further provides the possibility of economically producing sponge metal having an increased degree of reduction. Generally, it is easily possible to obtain a reduction degree of at least 98%.

When the oxide material to be reduced is in powder form, which it preferably always should be, it is suitable for pelletize the material or in another way form shaped bodies thereof. The pelletizing preferably should be carried out with the addition of pure water only, i.e., water without any binding agent, and the resulting product can be charged into the furnace without any preceding drying.

The gas-to-gas heat exchanger preferably is designed so as to permit at least part of the water vapour formed at the reduction (or other water vapour originating from, for example, moist pellets) to be condensed in the heat exchanger while the ingoing atmosphere is being preheated by the latent heat of condensation. Thereby, the economy of the process is improved still more.

Further characterizing features and what is achieved thereby will become apparent from the following detailed description of the invention. It will be shown, for example, how it is possible by simple means to modify the gas-to-gas heat exchanger so as to be a highly adaptable gas generator, which can produce oxidizing, or inert, or reducing atmosphere, just as desired at the moment.

The invention will be described below in greater detail and with reference to the accompanying drawing showing schematically a view of a preferred embodiment of the furnace plant according to the invention.

Figure 1:
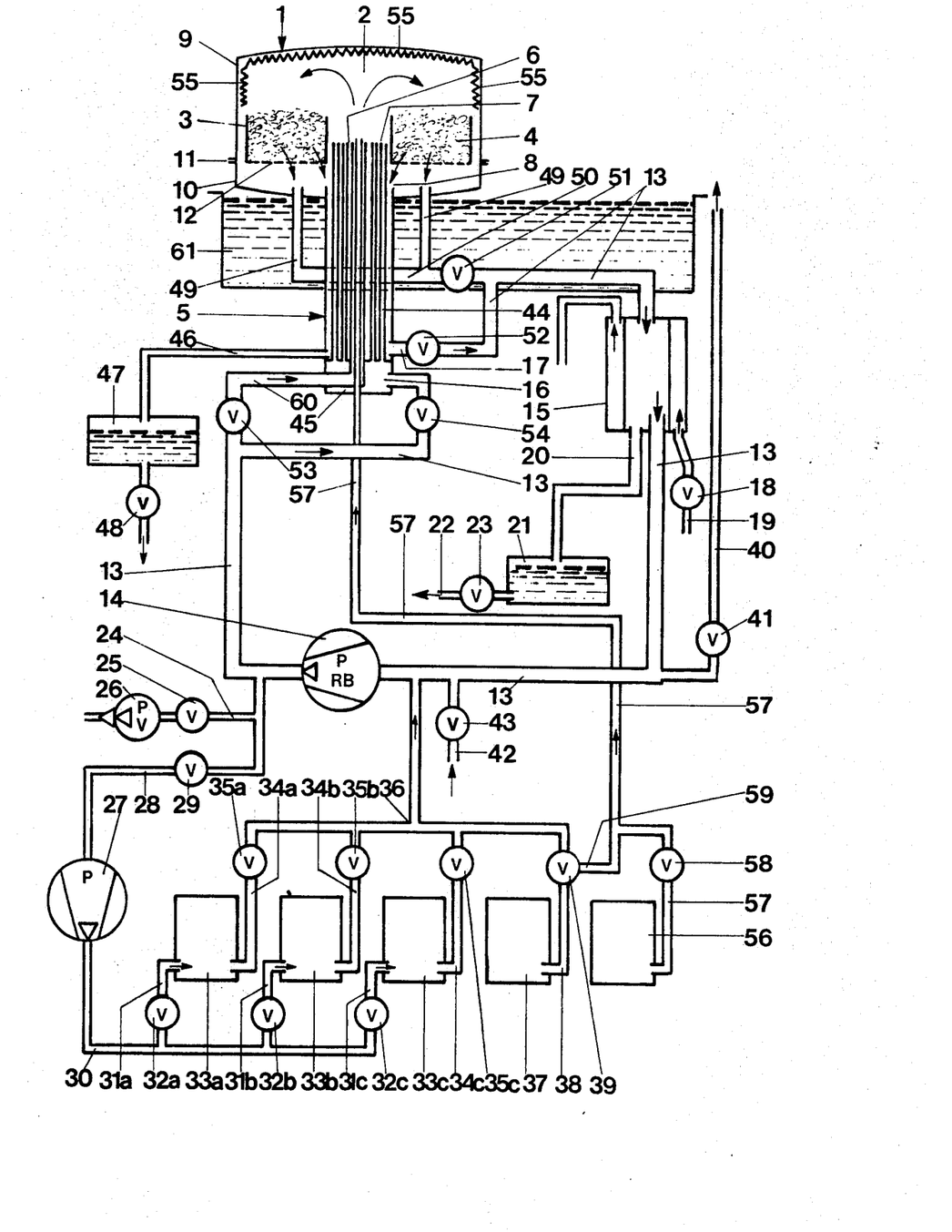

The furnace plant shown in the drawing comprises a furnace 1 with a heatable furnace chamber 2 and means 3 for supporting in the furnace chamber a stationary bed 4 of a charge of metal oxide to be reduced to sponge metal. Auxiliary equipment is connected to the furnace 1 for causing during a heating period, a reduction period and, when necessary, a cooling period, hot preferably non-reducing atmosphere, hot reducing atmosphere, and cold non-oxidizing atmosphere, respectively, to pass through the stationary bed. Although the plant shown comprises only a single furnace, it will be obvious to the skilled art worker that part of the auxiliary equipment can be used for several furnaces contained in one single plant.

According to the invention, said auxiliary equipment comprises a gas-to-gas heat exchanger 5 of substantially counter-current type, which at least partially is built-in in the furnace 1, and having a hot end 6 located in the furnace chamber 2 or in immediate connection thereto. The hot end 6 includes an outlet 7 located upstream of the stationary bed 4 for atmosphere heated in the heat exchanger, and an inlet 8 located downstream of the bed for gas to be cooled in the heat exchanger. It is thus possible, during the heating period and reduction period, to cool the relatively hot used atmosphere, just having passed through the stationary bed 4, by heat exchange substantially in counter-current to relatively cold fresh atmosphere, which thereby is at least preheated before it is introduced directly into the furnace chamber 2 immediately after the heat exchange. If the produced sponge metal is to be cooled in the furnace 1, the auxiliary equipment further comprises re-directing means (which will be described in greater detail below) for directing, during the cooling period, the cold cooling atmosphere entering the stationary bed 4 and the heated cooling atmosphere outgoing from the bed 4 in a non-heat-exchanging relationship to each other.

The furnace 1 shown is a pressure-tight and vacuum-tight sealable high-temperature furnace with a top portion 9 and a bottom portion 10 connected to each other by means of a flange joint 11. The furnace 1 has a sheet metal casing, which is resistant to both high-vacuum and several atmospheres excess pressure, and which is provided with a lining (not shown) of high-temperature resistant material, for example refractory bricks.

The means 3 for supporting in the furnace chamber 2 the stationary bed 4 comprises a trough 3 with a perforated bottom 12. In the embodiment shown, the trough 3 is annular, but it may of course be of any other suitable shape. Further, the trough 3 is provided with supports (not shown) and stands on the floor (not shown) of the furnace chamber 2. Said supports permit gas to flow between the perforated bottom 12 of the trough and the floor of the furnace chamber 2. The supports can, of course, be designed in different ways, for example, a beam system possibly provided with recesses may be used.

In order to cause the atmosphere selected for the occasion in question to flow through the stationary bed 4, said auxiliary equipment preferably comprises conduit means, such as a circulation conduit 13, and a circulator 14 and a gas cooler 15. One end of the circulation conduit 13 is connected to the inlet 16 for cold gas of the heat exchanger 5, and its other end is connected to the outlet 17 for cooled gas of the heat exchanger. Said circulation conduit 13 together with the furnace 1 and its gas-to-gas heat exchanger 5 form a closed circuit. The circulator is shown as a compressor 14, but in certain applications it may be a suitable fan. The circulation compressor 14, which preferably is infinitely variable, is connected into the conduit 13 for circulating gas through the closed circuit, and it has a suction side and a pressure side. The gas cooler 15 is connected into the circulation conduit 13 on the suction side of the circulation compressor 14 and preferably is water-cooled. Suitably, the cooler 15 is of the spiral heat exchanger type, and the gas and the cooling water are directed in counter-current to each other. The cooling of the gas is controlled by a valve 18 in a supply conduit 19 for the cooling water. A conduit 20 is connected to the gas side of the cooler 15 for the tapping of condensate to a closed condensate tank 21, in which the condensate level is controlled by level indicators (not shown) actuating a valve 23 provided in the discharge conduit 22 of the tank 21.

It is, furthermore, suitable that means (24–26) for evacuating the closed circuit are connected to the circulation conduit 13, preferably on the pressure side of the compressor 14, and that means (27–33) for recovering the evacuated atmosphere are connected to the evacuation means. In the embodiment shown in the drawing the evacuation means comprise an evacuation conduit 24 extending from the circulation conduit 13, a valve 25 mounted in the conduit 24 and a vacuum pump 26 disposed after the valve 25. The outlet of said pump opens into surrounding air, possibly via a stack (not shown). In the embodiment shown, the means for recovering the evacuated atmosphere comprise an auxiliary compressor 27, a conduit 28 provided with a valve 29 and connected between the suction side of the auxiliary compressor and the evacuation conduit 24 in a point between its connection to the circulation conduit 13 and the valve 25, a distribution conduit 30 connected to the pressure side of the auxiliary compressor 27 and branching into a number of branch conduits 31a, b and c, each of which having a valve 32a, b and c and opening into a pressure vessel 33a, b and c. The pressure vessel 33a may, for example, contain an inert atmosphere such as nitrogen, helium or argon, the container 33b may contain pure hydrogen gas, and the container 33c a reducing atmosphere such as a mixture of hydrogen and carbon monoxide. To the pressure vessels are also connected replenishing means (not shown) for compensating for the atmosphere consumed during the process. For returning said atmospheres to the closed circuit, each of the pressure vessels 33a, b and c, is connected over a branch conduit 34a, b and c, respectively, having a valve 35a, b and c, respectively, to a collecting conduit 36 opening into the circulation conduit 13 in a point between the gas cooler 15 and circulation compressor 14. Furthermore, a pressure vessel 37 or another suitable source of an unsaturated lower hydrocarbon, such as acetylene or propene, is connected to the collecting conduit 36 via a conduit 38 with a valve 39.

It is, of course, also possible to feed the auxiliary compressor 27 by the vacuum pump 26, possibly via a suitable purifying device, for recovering, for example, helium or hydrogen. The purifying device may also be connected between the auxiliary compressor 27 and the pressure containers 33. In certain cases, for example, when propene or acetylene are introduced into the closed circuit and at high temperature are decomposed therein, thereby increasing their volume many times, it is suitable to connect to the circulation conduit 13 a means for conducting away at least a part of the gas cooled in the heat exchanger 5 whenever such removal is desired. These means are shown in the drawing as a bleeder conduit 40 connected to the circulation conduit 13 in a point between the gas cooler 15 and the circulation compressor 14 and provided with a valve 41. Between the bleeder conduit 40 and circulation compressor 14, a conduit 42 is shown connected to the circulation conduit 13 which includes a valve 43 for passing an oxygen-containing gas into the closed circuit. The oxygen-containing gas may consist, according to the circumstances, of air at atmospheric pressure, air enriched with oxygen, or pure oxygen. The oxygen, of course, has to be supplied from a pressure vessel (not shown) or another suitable oxygen gas source.

In the shown embodiment of the furnace plant according to the invention, the sheet metal casing for the bottom portion 10 of the furnace is formed with a centrally disposed downward projecting portion, which constitutes a casing for the heat exchanger 5. The heat exchanger, thus, can be said to be built-in entirely in the furnace 1. The hot end 6 of the heat exchanger 5 is preferably located in the central opening of the annular trough 3, and preferably the gas-to-gas heat exchanger 5 comprises a tube bundle 44 having a multitude of relatively long and narrow heat exchanger tubes, but also other types of gas-to-gas heat exchangers may, of course, be used. Between the tube bundle 44 and the casing a heat insulation (not shown) is provided.

It also appears from the drawing that the furance 1 with its built-in heat-exchanger 5 will get an appearance reminding of a mushroom. The space for the charge is in the hat of the mushroom, and the space for the main part of the heat exchanger 5 is in the fot of the mushroom, but, of course, an assembly of other furnace types with other types of gas-to-gas heat exchangers may result in entirely different appearances. It further appears from the drawing that the cold atmosphere to be heated, which is fed to the heat exchanger 5 through the circulation conduit 13 and inlet 16, passes through an equalizing chamber 45 provided in the cold end of the heat exchanger and is conduited upwards on the inside of the tubes in the tube bundle 44 and after its passage through the stationary bed 4 is conducted downwards on the outside of the tubes in the tube bundle 44 and thereafter conducted away through the outlet 17 and circulation conduit 13. By interchanging the places of the inlet 16 and outlet 17, of course, the opposite flow direction in the heat exchanger can be used.

The heat exchanger preferably is dimensioned so as to permit the condensing of a substantial part of the water vapour, which the atmosphere coming from the stationary bed 4 contains, for example, during the heating of a moist charge and during the reduction with a hydrogen-containing atmosphere. Thereby also the latent heat of condensation of the water vapour can be utilized for preheating. The condensate is led away from the heat exchanger 5 through a conduit 46 to a closed condensate tank 47, in which the water level is controlled by level monitors (not shown) controlling a drain valve 48. It is, of course, possible to dispense with the condensate tank 47 and valve 48, and, instead, make the conduits 46 discharge into the condensate tank 21. During the reduction step, and in certain cases also during the heating step, the circulating atmosphere thus is purified with respect to water both in the gas cooler 15 and in the heat exchanger 5. If desired, the circulating gas may, of course, also be passed through a $CO_2$ purifier (not shown) and/or drier for the separation of $CO_2$ and for a further separation of water, respectively.

The aforementioned re-directing means, which are provided for directing during the cooling period the cold cooling atmosphere entering the stationary bed 4 and the heated cooling atmosphere outgoing from the bed 4 in a non-heat-exchanging relationship to each other, comprise a plurality of pipes 49 extending from the space between the perforated bottom 12 of the trough 3 and the floor of the furnace chamber 2 to a collecting conduit 50, which via a valve 51 is connected to the circulation conduit 13 upstream the gas cooler 15. The circulation conduit 13 includes a valve 52 located between the connection point of the collecting conduit 50 and the heat exchanger outlet 17 for cooled atmosphere. Since the temperature at the beginning of the cooling period may be very high, it is suitable in certain cases that at least a lower portion of the pipes 49 and, furthermore, the collecting conduit 50, the valve 51 and the subsequent portion of the circulation conduit 13 all the way to the cooler 15 are immersed in a cooling water bath 61. In order to hold during the cooling period the flow of the cooling gas as high as possible, it is suitable that the tube bundle 44 of the heat exchanger 5 comprises a central pipe 60 with a relatively large diameter which via a valve 53 is connected to the circulation conduit 13 at a point downstream of the circulation compressor 14. A valve 54 may, if desired, be also provided between said connection point of the pipe 60 and the heat exchanger inlet 16 for cold gas.

When the furnace 1 is heated electrically, it is in the embodiment shown suitable that the roof and walls of the furnace chamber 2 carry electrically heatable elements 55, which may be molybdenum elements when the atmosphere is non-oxidizing, but which preferably are oxidation-resistant elements, such as $MoSi_2$ elements, when also oxidizing atmosphere is involved, such as is the case when the furnace is opened at a temperature of, for example, 500°C.

When, instead, the furnace 11 is heated by the combustion of a fuel, it is suitable to charge the fuel into the furnace chamber 2 directly at the heat exchanger outlet for heated gas. The fuel, preferably combustible gas or oil, is supplied from a pressure vessel 56 or another suitable source through a fuel conduit 57 provided with a valve 58. The fuel conduit 57 extends through the gas-to-gas heat exchanger 5 and may advantageously be comprised in the tube bundle 44 thereof. Inside the heat exchanger 5 the fuel conduit may, for example, extend coaxially with the central large diameter cooling pipe 60. If due to the temperature and/or low to moderate fuel flow velocity, there is a risk of precipitation of soot in the fuel conduit 57 or of other operation disturbances, then the portion of the fuel conduit 57 located in the heat exchanger may be heat insulated and/or water-cooled. In certain cases it may also be suitable to use as fuel, instead of, for example, oil or natural gas, the unsaturated lower hydrocarbon contained in the pressure container 37. For this purpose, a conduit 59 may connect the valve 39 with the fuel conduit 57. In the arrangement described above, thus, the heat exchanger 5 acts as a burner, in which case it is suitable to form in the furnace roof a flame distributor and recuperator. It is also possible, however, to place this burner in a separate chamber or to apply one or more separate burners located in the furnace chamber or in separate chambers.

Any conventional furnace with gas-to-gas heat exchanger, may be suitable for use in the furnace plant according to the present invention.

THE PROCESS

In order to illustrate in greater detail the numerous possibilities provided by the present invention, in the following at first a basic process according to the invention for the production of sponge iron in an electrically heated furnace, and thereafter different variants of the process within the scope of the claims will be described.

Basic Process

The annular trough 3 is filled with a predetermined amount of shaped bodies formed of iron oxide in powder form by pelletizing of the like. The trough 3 is thereafter lowered into the open furnace 1. The following steps are then taken.

1. The cover 9 is lowered onto the lower part 10 of the furnace, and the furnace is sealed vacuum-tightly and pressure-tightly.

2. The closed circuit is evacuated by means of the vacuum pump 26. All gas valves, except 52, 54 and 25, are closed. When the desired vacuum, for example, approximately 3kPa, has been achieved, the evacuation valve 25 is closed and the pump 26 is stopped.

3. An inert atmosphere, such as $N_2$, He or Ar, is led into the closed circuit by opening the valve 35a so that the pressure vessel 33a is connected to the circulation conduit 13. Of these atmospheres, helium is to be preferred from a heat transfer point of view, and nitrogen gas from a price point of view. It must, therefore, be judged in each individual case which atmosphere would be the most suitable one. When the desired pressure, for example, between 0.1 and 0.2 MPa, has been achieved, the valve 35a is closed. Simultaneously with or subsequent to completed filling, the admission of current to the electric elements 55 is commenced and the circulation compressor 14 is started.

4. The heating is continued until the charge 4 has achieved the desired temperature, usually a temperature between approximately 1000°C and the melting temperature for the sponge iron quality to be produced. During the heating, the atmosphere is circulated from the compressor 14 through the circulation conduit 13 and valve 54, up through the heat exchanger 5 to the furnace chamber 2, past the elements 55 and down through the charge 4 and heat exchanger 5, further through the valve 52 and circulation conduit 13 with the gas cooler 15 back to the compressor 14. If the charge was moist at the start, it rapidly dries, and the evaporated water is condensed in the heat exchanger 5 and led away to the condensate tank 47 or 21. The heating can take place with a constant quantity of gas and at a gradually increasing pressure, or at a constant pressue and with a gradually decreasing quantity of gas. This decrease preferably is effected by opening the valves 29 and 32a and starting the auxiliary compressor 27, so that the inert atmosphere led away is returned to the pressure vessel 33a for being re-used later on. During the heating 17 it is suitable to circulate the inert atmosphere at a speed which is the lowest possible for obtaining an acceptable heating time.

5. When the desired temperature has been achieved, the admission of current to the elements 55 is interrupted, the condensate tanks 21 and 47 are emptied, and the circulation compressor 14 is slowed down or stopped. Furthermore, the valve 29 is opened, the auxiliary compressor 27 is started, and the valve 32a is opened for returning the inert atmosphere to the vessel 33a. When the pressure in the closed circuit has decreased to approximately 0.1 MPa, i.e., atmospheric pressure, the valves 29 and 32a are closed, the auxiliary compressor 27 is stopped, the vacuum pump 26 is started, and the valve 25 is opened. When stopping the circulation compressor 14, it is suitable to close the valve 54 in order to prevent hot gas from the furnace to flow rearwards and to arrive at the auxiliary compressor and the vacuum pump, respectively, without having been appreciably cooled. When the desired vacuum has been achieved, for example, 3 kPa, the evacuation valve 25 is closed and the vacuum pump 26 is stopped.

6. The closed circuit is filled with reducing atmosphere, preferably hydrogen, to a predetermined pressure, for example, approximately 0.5 MPa, by opening the valve 35b so that the pressure vessel 33b is connected with the circulation conduit 13. Simultaneously with said filling, the circulation compressor 14 is actuated to circulate the hydrogen at a desired relatively low speed, but with a large flow rate. At this high temperature the endothermic reaction between hydrogen and iron oxide takes place very rapidly, with temperature decrease and the formation of metallic iron and water vapour. Therefore, hydrogen must be supplied continuously to the closed circuit in order to maintain the predetermined pressure and thereby the large flow rate. The main part of the water vapour is condensed in the heat exchanger 5 and a smaller part in the gas cooler 15. The condensate is led off to the condensate tanks 47 and 21. The reduced metallic iron forms the thin fine-grained shell around each shaped body.

7. After the aforedescribed short initial phase of the reduction step the valve 35b is closed and, instead, the valve 35c is opened to replace the atmosphere, which was consumed at the reduction reaction, with a mixture of hydrogen and carbon monoxide from the pressure vessel 33c. At high temperatures such a mixture is considered to reduce more rapidly than each gas individually. The reduction with carbon monoxide is exothermic. The carbon monoxide content is preferably between 50% and 75%, and at a carbon monoxide content of 60% to 65% a change in the temperature due to the reduction reaction is not obtained. However, when the sponge iron must meet special requirements with respect to carbon content, the carbon monoxide content of the mixture must, of course, be adjusted accordingly.

During the reduction, hydrogen is oxidized to water vapour and carbon monoxide to carbon dioxide, but these gases are also in equilibrium with each other according to the formula for the water-gas reaction:

$$CO + H_2O \rightleftarrows H_2 + CO_2$$

The water-gas reaction is catalyzed by an iron surface, so that the reaction takes place twice as rapidly over the iron surface as over an oxide surface, and the use of pure hydrogen during the initial phase of the reduction step, as described above in item 6, yields a fine-grained iron surface, which can be utilized as catalyst. As the water vapour is condensed continuously in the heat exchanger 5 and gas cooler 15, the equilibrium is disturbed and the carbon monoxide reacts with the hydrogen gas to form a new equilibrium by formation of carbon monoxide and water vapour. The carbon potential of the reducing atmosphere defined by

$$\frac{[CO]^2}{[CO_2]}$$

is, thus, high and a carburization of the sponge iron takes place. If desired, the carbon potential can be reduced by the supply of hydrogen from the pressure vessel 33b. The carbon potential may also be controlled so as described in item 9 below. It is suitable to increase the flow rate of the gas through the charge by increasing the pressure, and at the same time to adjust the speed of the circulating gas so that unnecessary losses of energy do not occur and so that the utilization degree for the reduction gas is, for example, 75% of the degree being theoretically possible at the prevailing temperature. The theoretically possible utilization degree depends as known on the gas and of the temperature (see, for example, Jernkontorets Annaler 142 (1958):6, page 291, FIG. 1).

8. In order to prevent with certainty the gaseous reduction products from being enclosed in the sponge iron produced, the reduction can be carried out under pulsation of the pressure between its maximum value and the atmospheric pressure or even vacuum. The decrease in pressure during the pulsation can be effected substantially in the same manner as described in item 5 above, but the valve 32c is used for returning the mixture of hydrogen and carbon monoxide to the pressure vessel 33c. When a desired low pressure has been achieved in the closed circuit, the valve 35c is opened again to fill the closed circuit with the mixture of hydrogen and carbon monoxide to the predetermined pressure. If the temperature during the evacuation is sufficiently high, a certain decarburization and a continued decrease in the oxygen content of the charge are obtained.

9. When it is disadvantageous to carry on the main reduction, the final reduction is commenced at a temperature, which — with the aforesaid initial temperature — is above about 900°C, by evacuating and returning the mixture of hydrogen and carbon monoxide to the pressure vessel 33c in the manner described above, whereafter the valve 35b is opened and the closed circuit is filled with pure hydrogen gas from the container 33b. At high reduction temperatures of, for example, 1000°–1100°C it is, however, relatively difficult to remove the last oxygen with pure hydrogen. This takes place at least as rapidly at 550°C as at 1100°C. The reduction with hydrogen gas, furthermore, produces water vapour, and moist hydrogen gas has a decarburizing effect on the charge, so that carbon dioxide is formed. In order to keep the circulating hydrogen as active as possible, a lower unsaturated hydrocarbon, such as propene or acetylene, can be introduced into the hydrogen by opening the valve 39 to connect the pressure vessel 37 to the circulation conduit 13. In the circulation compressor the gases are mixed effectively, and at the high temperatures prevailing when the gases enter the furnace chamber 2 and pass through the charge, some of the following reactions take place:

$C_3H_6 + 3CO_2 \rightarrow 6CO + 3H_2$ $C_3H_6 + 3H_2O \rightarrow 3CO + 6H_2$ $C_2H_2 + 2H_2O \rightarrow 2CO + 3H_2$ $C_2H_2 + 2CO_2 \rightarrow 4CO + H_2$ As is apparent from the formulas, the reactions result in an increase in the pressure when the volume is held constant. If the increase in the pressure tends to become too high, the bleeder valve 41 can be opened and a part of the circulating atmosphere be led off through the bleeder conduit 40. In this way it is easy to achieve very high reduction degrees.

It also appears from the formulas that it is suitable, when the cooling is desired to be carried out in dry hydrogen in order not to run the risk of a minor re-oxidation at a lower temperature, to dry the hydrogen gas by a small addition of the lower unsaturated hydrocarbon immediately before the cooling step is commenced.

10. When the desired reduction degree has been achieved, the atmosphere is evacuated to the pressure vessel 33c in the same manner as described above. The temperature may then be 500°–700°C or still higher.

11. The closed circuit is now again filled with hydrogen from the pressure vessel 33b in the same manner as described above, but the pressure may now increase to 0.5 – 0.6 MPa or higher if the plant is dimensioned for higher pressure. The valve 52 is closed, the valves 51 and 53 are opened, and the valve 54 may be closed or remain open, as desired. By this re-routing the cold cooling atmosphere can arrive at the charge without having been heated by heat exchange with the hot gases coming from the charge. As the temperature decreases, more hydrogen must be supplied if the pressure is to be kept constant. In order to achieve a good cooling effect, the pressure should permanently be kept higher than about 0.2 MPa. The cooling takes place rapidly and is interrupted when the sponge iron has achieved a temperature, at which it can be exposed to air without any appreciable re-oxidation taking place, for example, at about 50°C. Thereafter the hydrogen is evacuated back to the pressure vessel 33b in the same manner as described above.

12. By opening the valve 43 air can now be let into the closed circuit, the furance can be opened, and the reduced and cooled charge be taken out.

Variant I

The heating step is carried out with oxidizing atmosphere, for example, air, instead of with inert atmosphere. This requires oxidation-resistant elements 55, and in certain cases problems can arise with respect to the oxidation-resistance of the heat exchanger. Instead, during the production of sponge iron from ore concentrate the advantage gained is that magnetite, $Fe_3O_4$, comprised in the concentrate, is oxidized to hematite, $Fe_2O_3$, which is easier to reduce. Furthermore, roasting is an exothermic or heat generating reaction, so that the heating requires less energy.

Variant II

The heating step is carried out with hydrogen. Thereby a very good heat transfer to the charge is obtained, but already at moderate temperatures the reducing properties of the hydrogen become noticeable, i.e., the formation of water vapour during an endothermic reaction. During reduction with hydrogen gas, furthermore, the reduction rate shows a peak within the temperature range 500°–600°C. Therefore, when the charge has been heated to approximately 550°C, the main part of the reduction is already carried out. Sponge iron produced at this low temperature is of such a fine porosity that it is pyrophoric. The heating, therefore, must be continued to a temperature of at least about 750°C in order to effect recrystallization of the iron, so that it will be of a coarser porosity and not pyrophoric any longer. Thus, heating as well as reduction and cooling can, if desired, be carried out in one and the same atmosphere, viz. hydrogen.

The heating step, however, preferably is carried out with a nonreducing atmosphere, because thereby the reduction temperature can be chosen according to desire. This is an advantage, because, for example, the reduction rate with pure hydrogen is as high at 1100°C as at 550°C (see Jernkontorets Annaler 142 (1958):6, page 292, FIG. 2). Pure hydrogen gas, however, can at about 1100°C theoretically be utilized to 40%, but at about 550°C only to 20% (loco cit. page 201, FIG. 1). This implies that the gas velocity or the pressure must be twice as high, if the reduction is to take place within the same time in both cases.

Variant III

It is possible, at a certain expense to gas economy, to abolish the vacuum pump 26 and, instead, when exchanging atmosphere "rinse" the closed circuit with reducing or inert atmosphere.

Variant IV

It is likewise possible, with a certain deterioration in gas economy, to dispense with the possibility of re-using respective atmospheres by not providing the plant with the auxiliary compressor 27 and associated conduits and valves.

Variant V

Instead of during the reduction compensating for the consumed hydrogen by supplying fresh hydrogen and for the consumed mixture of hydrogen and carbon monoxide by supplying a fresh mixture of hydrogen and carbon monoxide, the consumed atmosphere can be compensated for by supplying, for example, methane or natural gas, which will be cracked at the high temperature in the furnace. The cracking reaction, however, is highly endothermic and therefore requires additional supply of energy.

Variant VI

If the sponge iron produced is to be taken out of the furnace in hot state, i.e., with a temperature of preferably about 500°C, suitably at most 700°C, in order to be charged immediately into an adjacent steel furnace, it is suitable first to evacuate the closed circuit and, in the manner described, recover the discharged atmosphere, and thereafter to fill the closed circuit with nitrogen from the pressure vessel 33a to atmospheric pressure. The nitrogen will protect the sponge iron against oxidation during the work involved with the opening of the furnace. Instead of nitrogen any other suitable non-oxidizing atmosphere may, of course, be used.

Variant VII

With a gas-fired furnace, which consequently has no elements 55, the heating step differs from the one described in the basic process in the following respects.

Before the furnace cover 9 is lowered onto the lower part 10, the air valve 43 and bleeder valve 41 are opened. Thereafter the circulation compressor 14 is started, and the valve 58 or valve 39 is opened for supplying fuel through the fuel conduit 57 to the hot end 6 of the heat exchanger 5. After ignition of the outflowing fuel, the cover 9 can be positioned.

The amounts of air and fuel are adjusted to each other to provide complete combustion. With excess air, the heating atmosphere becomes oxidizing, while with stoichiometric amounts it will become inert. Owing to the preheating of the air, high flame temperatures, and thereby a more rapid heating or a lower fuel consumption can be obtained. If desired, the air may be oxygen-enriched, or oxygen gas may be used. When the charge has been heated to the predetermined temperature, the process continues according to Variant VIII below, or the open fuel valve (58 or 39) as well as the bleeder valve 41 and the air valve 43 are closed and the process is thereafter continued as stated in item 5 in the basic process, possibly modified according to one or more of the Variants III–VI above.

Variant VIII

When with a gas-fired furnace the desired reduction temperature has been achieved, the air supply can be reduced so as to render the combustion incomplete for obtaining a reducing atmosphere. After completed reduction, the fuel valve, bleeder valve and air valve are closed and thereafter the process is continued as described above in item 10 or 11, possibly modified according to one or more of the Variants III, IV and VI above.

It is easily understood that additional variants of the process according to the invention are possible within the scope of the claims.

In order to further illustrate the invention, some practical process examples are described in the following examples.

EXAMPLE 1

A charge consisting of pellets with a size of about 10 mm and rolled of calcined pyrites and pure water without additives was placed in moist state into an electrically heated furnace. After complete evacuation of the closed circuit hydrogen was supplied to a pressure of about 0.15 MPa. The water was driven off by heating during circulation of the hydrogen gas. Thereafter the charge temperature was raised, while the circulation still was going on, to between 550°C and 600°C, and the pressure was increased to about 0.4 MPa. After about 0.5 h at these conditions the reduction was substantially completed. Thereafter the temperature was raised to 1150°C, and after through-heating at this temperature the hydrogen pressure was increased to about 0.5 MPa. Cooling was carried out immediately. When the temperature of the charge had been lowered to about 30°C, the furnace was evacuated and air was passed in. The charge was thereafter taken out and analyzed. The result of the analysis was as follows.

| Analysis | Cu | Co | Ni | Zn | Pb |
|---|---|---|---|---|---|
| Pyrites | 0,104 | 0,062 | 0,008 | 0,30 | 0,020 |
| Sponge | 0,150 | 0,087 | 0,012 | 0,003 | 0,001 |
|  | S | $Fe_{total}$ | $Fe_{metal}$ | Reduction degree |  |
| Pyrites | 1,09 | 67,1 | 0 | — |  |
| Sponge | 0,026 | 95,1 | 95,0 | 99,9 |  |

The analyses show that zinc and lead almost entirely had been distilled off, and they had precipitated as an easily removable powder on the heat exchanger surface. Copper and cobalt contents, furthermore, are not affected by the reduction.

EXAMPLE 2

The process according to Example 1 was repeated with calcined pyrites of a different analysis (see below), but with the difference that the reduction was completed at 550°C with subsequent passivation at a temperature just above 750°C.

| Analysis | Cu | Co | Ni | Zn | Pb |
|---|---|---|---|---|---|
| Pyrites | 0,096 | 0,062 | 0,008 | 0,29 | 0,020 |
| Sponge | 0,134 | 0,080 | 0,013 | 0,17 | 0,006 |
|  | S | $Fe_{total}$ | $Fe_{metal}$ | Reduction degree |  |

-continued

| | | | | |
|---|---|---|---|---|
| Pyrites | 0,870 | 67,3 | 0 | — |
| Sponge | 0,272 | 94,2 | 93,1 | 98,8 |

EXAMPLE 3

The process according to Example 1 was repeated with calcined pyrites of still another analysis (see below), but with the difference that during the final phase of the reduction the temperature was raised to 1350°C.

| Analysis | Cu | Co | Ni | Zn | Pb |
|---|---|---|---|---|---|
| Pyrites | 0,107 | 0,062 | 0,008 | 0,30 | 0,021 |
| Sponge | 0,148 | 0,087 | 0,013 | 0,008 | 0,001 |
| | S | $Fe_{total}$ | $Fe_{metal}$ | Reduction degree | |
| Pyrites | 0,960 | 67,7 | 0 | — | |
| Sponge | 0,050 | 95,1 | 95,0 | 99,9 | |

Corresponding experiments were carried out with crushed scale, fume from oxygen refining, oxides recovered in connection with regeneration of pickling baths, and cleaned grinding wastes (swarf). In all cases correspondingly high reduction degrees were obtained.

EXAMPLE 4

Two tons of sintered pellets (analysis below) having an average diameter of 14 mm were charged to a height of 0.8 meters in an annular sheet metal container having a perforated bottom. The charge was heated in circulating nitrogen at a pressure of 0.2 megapascals to 850°C for 40 minutes. After heating, the system was evacuated and hydrogen was introduced and thereafter the reduction was carried out during recirculation of the hydrogen at a constant temperature for 50 minutes at a pressure of 0.4 megapascals. Next, cooling was carried out immediately by recirculating hydrogen and the pressure was permitted to drop successively to 0.2 megapascals. When the temperature had been lowered to about 50°C, the furnace was evacuated and nitrogen was introduced whereafter the charge was taken out and analyzed. Analysis gave the following result.

| | $Fe_{total}$ | $Fe_{metal}$ | Reduction Degree |
|---|---|---|---|
| Sinter | 66.1 | 0 | 0 |
| Sponge | 89.3 | 84.1 | 94.2 |

EXAMPLE 5

The furnace was charged as in Example 4 but the charge was heated by means of an LPG air burner to a top surface temperature of 1050°C. Then the temperature at the bottom of the charge was 675°C. The consumption of LPG was 26 kilograms per ton of sinter. After evacuation of the furnace, the reduction was carried out in accordance with Example 4. By heating the charge by means of an LPG burner, about 300 kilowatt hours of electrical energy per ton of sponge iron were saved in comparison with Example 4. Analysis gave the following results.

| | $Fe_{total}$ | $Fe_{metal}$ | Reduction Degree |
|---|---|---|---|
| Sinter | 66.3 | 0 | 0 |
| Sponge | 90.1 | 84.8 | 93.0 |

ENERGY REQUIREMENT

It is extremely difficult to make qualified technical and economical comparisons not only between sponge iron processes contra blast-furnace processes but also between the different sponge iron processes relative to each other, because in many cases the published figures are based on different calculation methods and the reported basic data are insufficiently detailed. The plants often have been of different sizes and in varying degrees of development. Different final products have been manufactured, and different raw ore materials and forms of energy have been used. It is, however, usual to convert the consumption of fuel, nautral gas and electricity to giga calories per ton of produced iron (1 Gcal = 4,186 GJ) and to compare the total energy consumption thus obtained.

In Table 1 below such a comparison is made between some known, industrially applicable processes and three different processes according to the present invention, designated in the Table by A, B and C. In case A an electrically heated furnace is used, and the heating step is carried out in an inert atmosphere. 600 KWh/t Fe are here consumed for the heating. The reduction is carried out with hydrogen produced by electrolysis with a calculated efficiency degree of the cells of 75%. 2230 KWh/t Fe are here consumed for the production of hydrogen. In case B a gas-fired furnace is used which requires 45 kg LP-gas/t Fe. The reduction is carried out with hydrogen produced by reformation of 150 m³ natural gas/t Fe. About 15 m³ natural gas are consumed per 150 m³ reformed gas (corresponding to 600 m³ hydrogen). In case C the same heating step is used as in case A, and the production method for the hydrogen gas is the same as in Case B. In none of the cases has been taken into account the energy saving which is obtained when also the latent heat of condensation is utilized. This energy saving amounts to 0.25 Gcal/t Fe.

TABLE 1

| Process | LP-gas kg | natural gas m³ | oil kg | coke kg | electricity kWh | Gcal/t | Fe Total |
|---|---|---|---|---|---|---|---|
| Wiberg, a | | | | 210 | 1100 | 1,67 0,94 | 2,6 |
| b | 50 | | | 150 | 1100 | 1,67 0,94 | 2,6 |
| Midrex | | 410 | | | | | 3.5 |
| Purofer, a | | 450 | | | | | 3,7 |
| b | 310 | | | | | | 3,7 |
| HyL | | 525–700 | | | | | 4,5–6 |
| Blast-Furnace | | | 50 | 500 | | 3,75 0,5 | 4,3 |
| Kawasaki | | 27 | | | | 0,26 | |

TABLE 1-continued

| Process | LP-gas kg | natural gas m³ | oil kg | coke kg | electricity kWh | Gcal/t | Fe Total |
|---|---|---|---|---|---|---|---|
|   |   |   |   |   | 98 | 0,08 |   |
|   |   |   |   | 470 |   | 3,20 | 3,5 |
| A |   |   |   |   | 2830 |   | 2,4 |
| B | 45 |   |   |   |   | 0,50 |   |
|   |   | 165 |   |   |   | 1,49 | 2,0 |
| C |   | 165 |   |   | 600 | 0,50 |   |
|   |   |   |   |   |   | 1,49 | 2,0 |

The above description, of course, is only intended to illustrate the present invention. A great number of variants and modifications thereof, for example, concerning the equipment, constituents, proportions and stated conditions, can be utilized without transgressing the scope of the invention such as it is defined in the following claims. In the "gas-fired" furnace, for example, oil can be used as fuel. With certain ores and other impure oxidic starting materials, furthermore, it may be suitable first to roll pellets, which are subjected to a chloridizing roasting in a separate furnace and thereafter are leached for removing such impurities as sulphur, arsenic, copper, lead, zinc, gold, silver, cobalt, etc. Thereafter new pellets are rolled of the purified leach remainder and used as starting material for carrying out the process described above. It is also possible, if desired, to admix during the rolling of pellets a solid carbon-containing reducing agent thereto, for example coal dust, waste products from refineries and also sawdust and the like. Also pellets produced in the usual way, of course, may be used, but as they normally contain cement, i.e., $SiO_2$, which increases the remelting costs, it is preferable to use pellets rolled with pure water without additives.

What is claimed is:

1. A process for batch production of sponge iron, comprising a charging step, during which an oxide material of the iron is arranged as a stationary bed in a furnace chamber, at least one heating step, during which a hot atmosphere is caused to flow through said stationary bed for heating the same, and at least one reduction step, during which hot reducing atmosphere is caused to flow through said stationary bed of oxidic material for reducing the same to sponge iron, comprising heat exchanging, during the heating step and the reduction step, the relatively hot used atmosphere, which has just passed through the stationary bed, substantially in counter-current with relatively cold fresh atmosphere in order to preheat the cold atmosphere before introducing it into the furnace chamber directly after the heat exchange.

2. A process according to claim 1, further comprising additionally heating said atmosphere during the heating step by means of electrically heated elements provided in the furnace chamber.

3. A process according to claim 1, wherein the atmosphere used during the heating step is a non-reducing atmosphere.

4. A process according to claim 3, wherein said atmosphere used during the heating step is inert.

5. A process according to claim 4, wherein said inert atmosphere is selected from the group consisting of nitrogen, helium and argon.

6. A process according to claim 1, further comprising heating said atmosphere in the heating step during circulation in a closed circuit.

7. A process according to claim 6, further comprising initiating the heating step by first evacuating and thereafter filling the closed circuit with said atmosphere.

8. A process according to claim 6, further comprising heating the stationary bed to a predetermined high temperature, then evacuating the closed circuit and recovering said atmosphere, and thereafter filling the closed circuit with said reducing atmosphere.

9. A process according to claim 3, wherein during the heating step the relatively cold, fresh atmosphere, which has been preheated by the heat exchange, contains oxygen, said process further comprising introducing simultaneously, but separately, a fuel into the furnace chamber, mixing said fuel with the just preheated oxygen-containing atmosphere, and combusting the fuel completely with an excess of the preheated atmosphere to form a hot oxidizing atmosphere, which constitutes the hot nonreducing atmosphere.

10. A process according to claim 9, wherein an unsaturated lower hydrocarbon constitutes at least a part of the fuel.

11. A process according to claim 10, wherein the unsaturated lower hydrocarbon is selected from the group consisting of propene and acetylene.

12. A process according to claim 9, characterized by heating the stationary bed to a predetermined high temperature, then finishing the heating step and initiating the reduction step by combusting said fuel incompletely with a sub-stoichiometrical amount of the preheated oxygen-containing atmosphere to form a soot-free, carburizing, hot, reducing atmosphere.

13. A process according to claim 12, further comprising driving the incomplete combustion of hydrocarbon fuel so as to produce a molar ratio $H_2/CO$ in the soot-free reducing atmosphere of between about 1/1 to 1/3.

14. A process according to claim 12, further comprising driving the reduction to a predetermined degree of reduction, the stationary bed still having a relatively high temperature, and subjecting the stationary bed to vacuum for effecting a certain decarburization and a continued decrease of the oxygen content in the stationary bed.

15. A process accordng to claim 1, further comprising first cooling additionally during the reduction step the used atmosphere outgoing from the furnace chamber, which used atmosphere already has been cooled by heat exchange with ingoing fresh atmosphere, and then mixing a main part of said additionally cooled atmosphere with reducing compensatory gas in an amount necessary for compensating for the portion of the reducing gas, which was consumed during the passage of the atmosphere through the stationary bed, and thereafter recirculating in a closed circuit to the furnace chamber the gas mixture thus obtained, which constitutes said fresh atmosphere.

16. A process according to claim 15, further comprising carrying out at least the main part of the reduction step with an atmosphere containing $H_2$ and CO in a molar ratio of between about 1:1 and 1:3.

17. A process according to claim 15, wherein at least during an initial phase the reducing atmosphere consists of $H_2$.

18. A process according to claim 15, further comprising adding at least in a final phase a lower unsaturated hydrocarbon in order to decrease the content of a completely oxidzed gaseous reaction product formed during the reduction reaction and comprised in the re-circulating atmosphere.

19. A process according to claim 15, further comprising evacuating and thereafter filling the closed circuit with fresh reducing atmosphere at least once during the reduction step.

20. A process according to claim 6, further comprising keeping the circulating atmosphere at over-atmospheric pressure.

21. A process according to claim 15, further comprising keeping the circulating atmosphere at over-atmospheric pressure.

22. A process according to claim 21, further comprising alternatingly raising and lowering the pressure several times during the reduction step.

23. A process according to claim 1, wherein at least during a part of the reduction step the outgoing used atmosphere contains water vapour, the process further comprising cooling the water vapour containing atmosphere by said heat exchange sufficiently for partially condensing the water vapour.

24. A process according to claim 1, further comprising heating the stationary bed during the heating step to a temperature between about 1000°C and a temperature immediately below the melting temperature for the sponge metal to be produced.

25. A process according to claim 1, further comprising carrying out the reduction step with falling temperature and finishing the reduction step before the temperature of the stationary bed has fallen to about 900°C, when the reducing atmosphere has a high carbon potential, and to about 500°C, when the reducing atmosphere consists essentially of $H_2$.

26. A process for batch production of sponge iron, comprising a charging step, during which an oxide of the iron is arranged as a stationary bed in a furnace chamber; at least one heating step, during which a hot atmosphere is caused to flow through said stationary bed for heating the same, said hot atmosphere being heated by electrically heated elements provided in the furnace chamber and by circulation in a closed circuit; and at least on reduction step, during which hot reducing atmosphere is caused to flow through said stationary bed of oxidic material for reducing the same to sponge iron; comprising heat exchanging, during the heating step and the reduction step, the relatively hot used atmosphere which has just passed through the stationary bed substantially in counter-current with relatively cold fresh atmosphere in order to preheat the cold atmosphere before introducing it into the furnace chamber directly after the heat exchange; and additionally cooling, during the reduction step the used atmosphere outgoing from the furnace chamber, then mixing a main part of the additionally cooled atmosphere with reducing compensation gas in an amount sufficient for compensating for the portion of the reducing gas which was consumed during passage through the stationary bed, and recirculating to the furnace chamber the gas mixture thus obtained, which constitutes fresh atmosphere, in the closed circuit.

27. A process for batch production of sponge iron, comprising a charging step, during which an oxide of the iron is arranged as a stationary bed in a furnace chamber; at least one heating step, during which a hot atmosphere containing a mixture of oxygen and a fuel is combusted completely to form a hot non-oxidizing atmosphere which is caused to flow through said stationary bed for heating the same; and at least one reduction step, during which hot reducing atmosphere is caused to flow through said stationary bed of oxidic material and recirculated via a closed circuit for reducing the same to sponge iron; comprising heat exchanging, during the heating step and the reduction step, the relatively hot used atmosphere which has just passed through the stationary bed substantially in counter-current with relatively cold fresh atmosphere in order to preheat the cold atmosphere before introducing it into the furnace chamber directly after the heat exchange; and additionally cooling, during the reduction step the used atmosphere outgoing from the furnace chamber, then mixing a main part of the additionally cooled atmosphere with reducing compensation gas in an amount sufficient for compensating for the portion of the reducing gas which was consumed during passage through the stationary bed, and recirculating to the furnace chamber the gas mixture thus obtained, which constitutes fresh atmosphere, in the closed circuit.

28. A process for batch production of sponge iron, comprising a charging step, during which an oxide material of the iron is arranged as a stationary bed in a furnace chamber, at least one heating step, during which a hot atmosphere is caused to flow through said stationary bed for heating the same, at least one reduction step, during which hot reducing atmosphere is caused to flow through said stationary bed of oxidic material for reducing the same to sponge iron, and a cooling step, during which cold non-oxidizing atmosphere is caused to flow through said stationary bed for cooling the sponge iron formed, comprising heat exchanging during the heating step and the reduction step the relatively hot used atmosphere, which just has passed through the stationary bed, substantially in counter-current with relatively cold fresh atmosphere in order to preheat the cold atmosphere before introducing it into the furnace chamber directly after the heat exchange, and by conducting during the cooling step ingoing cold fresh atmosphere and outgoing relatively hot used atmosphere in a non-heat-exchanging relationship to each other.

29. A process according to claim 28, wherein the atmosphere used during the heating step is a non-reducing atmosphere.

30. A process according to claim 28, further comprising first cooling additionally during the reduction step the used atmosphere outgoing from the furnace chamber, which used atmosphere already has been cooled by heat exchange with ingoing fresh atmosphere, and then mixing a main part of said additionally cooled atmosphere with reducing gas in an amount necessary for compensating for the portion of the reducing gas, which was consumed during the passage of the atmosphere through the stationary bed, and thereafter recirculating in a closed circuit to the furnace chamber the gas mixture thus obtained, which constitutes said fresh atmosphere.

31. A process according to claim 30, further comprising completing the reduction then evacuating the closed circuit and recovering the reducing atmosphere, and thereafter filling the closed circuit with the non-oxidizing atmosphere for the cooling step.

32. A process according to claim 30, further comprising cooling during the cooling step the non-oxidizing atmosphere during circulation thereof in a closed cooling circuit.

33. A process according to claim 30, wherein the non-oxidizing atmosphere consists of $H_2$.

34. A process according to claim 32, further comprising cooling the stationary bed to a temperature, at which it can be brought into contact with air without giving rise to appreciable oxidation of the sponge iron, then evacuating the closed cooling circuit and recovering the nonoxidizing atmosphere and thereafter letting air into the cooling circuit.

* * * * *

UNITED STATES PATENT AND TRADEMARK OFFICE
CERTIFICATE OF CORRECTION

PATENT NO. : 3,964,898
DATED : June 22, 1976
INVENTOR(S) : Hans Edward Henrik Murray It is certified that error appears in the above-identified patent and that said Letters Patent are hereby corrected as shown below:

Column one, line 49 change "effects" to --efforts--.

Column two, line 67 change "befoe" to --before--.

Column four, line 25 change "for" to --to--.

Column seven, line 16 change "fot" to --foot--.

Column eight, line 7 change "a" to --as--.

Column nine, line 42 change "pressue" to --pressure--.

Column ten, line 18 change "the" to --a--.

Column nineteen, line 53 change "on" to --one--.

Signed and Sealed this

Eighteenth Day of April 1978

[SEAL]

Attest:

RUTH C. MASON
*Attesting Officer*

LUTRELLE F. PARKER
*Acting Commissioner of Patents and Trademarks*